Oct. 8, 1935.    W. E. SLOAN    2,016,396
FLUSH VALVE
Filed Dec. 31, 1929
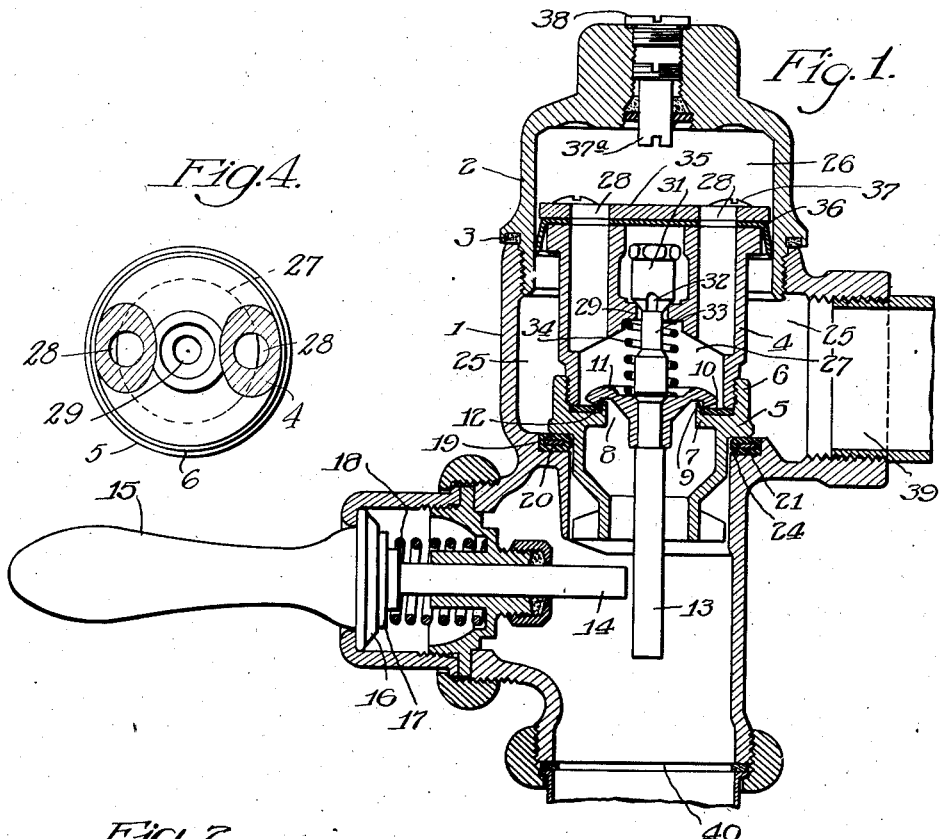
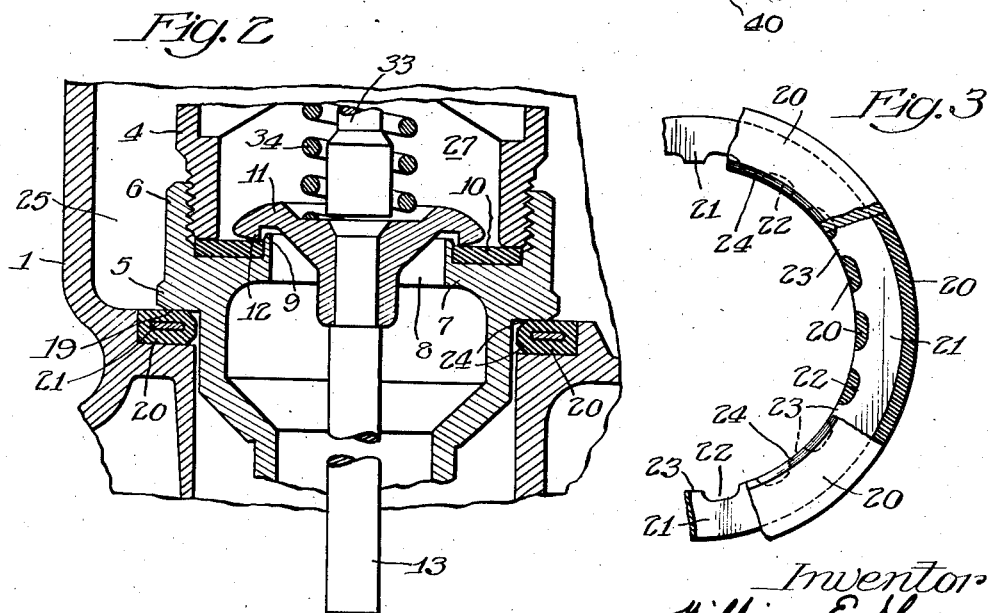

Patented Oct. 8, 1935

2,016,396

UNITED STATES PATENT OFFICE 2,016,396

FLUSH VALVE

William E. Sloan, Chicago, Ill.

Application December 31, 1929, Serial No. 417,641

9 Claims. (Cl. 137—93)

This invention relates to flush valves and has for its object to provide a new and improved device of this description.

The invention has as a further object to provide a flush valve with a by pass provided with means for preventing foreign material from lodging therein.

The invention has as a further object to provide a flush valve with an auxiliary valve and means for insuring the proper seating and operation of the auxiliary valve.

The invention has as a further object to provide a seat for the main valve which is easily reversible and renewable.

The invention has further objects which are more particularly pointed out in the accompanying description.

Referring now to the drawing, Fig. 1 is a sectional view through one form of valve embodying the invention.

Fig. 2 is an enlarged sectional showing the seats for the auxiliary valve and main valve.

Fig. 3 is a top view with parts broken away of the seat for the main valve.

Fig. 4 is a horizontal sectional view through that portion of the piston containing the passageways 28 and with the by-pass member removed.

Like numerals refer to like parts throughout the several figures.

Referring now to the drawing, I have shown a flush valve having a casing consisting of the parts 1 and 2 connected together by a threaded connection. A gasket 3 is inserted between them to insure a water tight joint. Working in the casing is a piston 4 which has removably connected with it the seating member 5. The seating member 5 has an outer upstanding wall 6 which is threaded and engages the threaded end of the piston 4. The seating member is provided with an inwardly projecting ledge 7 which surrounds the opening 8. This ledge is provided with an upstanding member 9 which surrounds the opening 8. A valve seat 10 is located between the upstanding member 1 and the upstanding wall 6. This valve seat is of non-metallic yielding material such, for example, as rubber and is clamped and held in position by the end of the piston 4.

This seat forms a seat for the auxiliary valve 11 and also acts as a gasket to form a water tight joint between the piston 4 and the seating member 6. The auxiliary valve 11 has a downwardly projecting rim 12 which fits around the upstanding member 9. This auxiliary valve is held in its central position by the upstanding member 9 and the rim 12, both when the auxiliary valve is closed and when it is tilted to its open position. The rim 12 and the upstanding member 9 are so proportioned that when the auxiliary valve is closed it is supported upon the seat 10. When the auxiliary valve is open, the water in flowing therethrough has an unobstructed passageway between the rim 12 and the upstanding member 9 and this results in a quicker opening with low operating pressure, an important factor in valves of this description.

The auxiliary valve is provided with a stem 13. An actuating member 14 engages this stem to move it laterally to tilt the auxiliary valve to open it.

The actuating member 14 is actuated by a handle 15 which has an engaging member 16 which engages the enlarged end 17 of the actuating member. The actuating member is moved when the handle 15 is moved in any direction and when the handle is released, the retracting spring 18 moves the parts to their initial position. The seating member 6 has a seating face 19 which when the valve is closed, engages the seat 20. This seat is made of non-metallic material such as rubber and fits into a groove in the casing 1. This seat fits the groove tightly so that it will remain in position when the valve is being shipped. The seat is preferably made of soft rubber which is vulcanized around a metal reinforcing member 21. The reinforcing ring is preferably notched around its inner edge, as shown at 22. Between the notches are projections 23 which form the inner radius of the metal ring and which serve as guides or wearing parts while the notches make possible a substantially continuous uniting of the rubber around the reinforcing ring. The seat has its edges beveled or chamfered, as shown at 24. This aids in the quiet flow of the water through the main valve.

The seat can be easily removed by reaching down into the casing and taking hold of it. The seat can be reversed by simply removing it and turning it over and replacing it in the groove. This construction provides a seat for the main valve which can be easily and quickly placed in position and which, when in position, provides an effective seat which remains effective through a long period of use. The piston 4 divides the casing of the valve into two chambers 25 and 26. A by pass connection is provided between the chamber 25 and the chamber 26. This by pass is arranged so that after the valve has been opened, water will pass from the chamber 25 to the chamber 26 so as to equalize the pressures between the chambers and cause the main valve to close.

In the construction shown, the piston 4 is provided with a chamber 27. This chamber 27 is connected by passageways 28 with the chamber 26. The chamber 27 is connected by a passageway 29 with the chamber 25. Projecting into the passageway 29 is a by pass member 31 which normally seats at the end of said passageway 29. The upper part of the piston 4 is large so as to fill the entire chamber but the lower part below the packing is simply a thin member of sufficient thickness to contain the passageways 28. The space above the small passageway 29, which contains the by-pass member 31, is open at both sides and communicates with the lower chamber 25. The connection between the lower chamber and upper chamber is then through the space containing the by-pass member, the passageway 29, the chamber 27 and the passageways 28. This by pass member at its seat is provided with a groove 32 so that when the by pass member is seated at the end of the passage 29, this passage is closed except for the small amount of water that may pass through this groove 32. The by pass member 31 has connected therewith a stem 33, preferably integral therewith, the lower end of the stem resting on the top of or in proximity to the auxiliary valve 11.

A spring 34 surrounds the stem and engages the top of the auxiliary valve and the wall around the passageway 29. The lower end of the stem 33 is preferably enlarged but is small enough to pass up through the passageway 29. The piston 4 is provided with a removable top plate 35 and cup washer 36 held in place by the fastening device 37. By removing the top plate, and cup washer, the by pass member 31 may be easily taken out of the piston for cleaning or replacement and when removed the stem 33 is pulled up through the passageway 29. An adjustable stop 37a is provided in the casing which limits the upward movement of the piston. This movement of the piston can, therefore, be regulated by adjusting this stop. The stop is located in a threaded hole and is preferably made inaccessible and at the top of the threaded hole a screw 38 connected with the stop is provided. The valve casing is provided with an inlet 39 and an outlet or discharge 40.

The use and operation of my invention are as follows:

When the parts are in the position shown in the drawing, the chambers 25 and 26 are filled with water. If, now the handle 15 is moved it moves the actuating device 14 which engages the stem 13 of the auxiliary valve and moves it to one side thereby tilting one edge of the auxiliary valve so as to permit the water to escape from chamber 26 through passageways 28 and chamber 27, this water passing out through the discharge pipe 40. The pressure in chamber 25 on the piston lifts the piston so as to open the main valve and the piston lifts the piston so as to open the main valve and permit water to be discharged from the chamber 25 between the face 19 of the main valve and the seat 20. The tilting of the auxiliary valve 9 causes it to lift the stem 33 and the by pass member 31 thus moving the by pass member from its seat and permitting a small quantity of water to rush directly from the supply by means of the passageway through the passage 29 and then out through the auxiliary valve to the discharge. This rush of water washes away any foreign matter that may be lodged around the by pass member.

During this operation there is a short period when the by pass member floats in the water and is free to be rotated about its axis and is rotated about its axis by the flow of the water about it. This movement of the by pass member is an additional guard against the building up of deposits on its seat and in the groove 32. When the handle 15 is released, the spring 34 returns the auxiliary valve to its normal position so as to close the discharge from the chamber 27 and the by pass member 31 also moves to its seat closing the by pass passageway except for the small portion thereof formed by the groove 32. Water then passes from the chamber 25 through the groove 32 into chamber 27 and then through passageway 28 up into chamber 26, thus building up the pressure in the latter chamber. When the pressure in this chamber 26 reaches a predetermined amount, the main valve is moved to its closed position. When the main valve is closed, the pressure in chamber 26 becomes equalized with the pressure in chamber 25 by the pressure of water through the groove 32. During the closing movement, the flush and refill takes place. It will be noted that in this construction there are two openings through the piston, namely the opening controlled by the auxiliary valve 11 and the opening controlled by the by pass member 31 and that these two openings are positively open when the handle 15 is moved.

It will further be seen that when these two openings are thus positively opened, the water rushes from chamber 25 through these openings and carries any foreign matter that may be in the by pass, out through the valve into the discharge pipe. This prevents the foreign matter from remaining in the valve in any position where it might have a detrimental action.

It will be seen from this construction that the by pass is cleaned at every operation of the valve and since the by pass member changes its position every time the valve is operated, that is, moves about its axis so as to cause the groove 32 to seat at a different portion of the seat at the end of the passageway 29, it is impossible for deposits to build up so as to interfere with the proper operation of the by pass.

The arrangement of the auxiliary valve also prevents the undue wear of its seat and insures its being properly centered both when open and when closed.

I claim:

1. A flush valve comprising a main valve, a piston which divides said main valve into two chambers, a by pass through the piston connecting the two chambers, a movable by pass member located in said connection and normally partially closing said connection, a small by pass around said by pass member which is always open, a stem connected with said by pass member, an auxiliary valve mounted in said piston and normally engaged by said stem, and means for moving said auxiliary valve so as to lift the by pass member and enlarge the by pass passageway to permit it to be washed out, said by pass member being free to move about its axis in response to the movement of the flow of water when the auxiliary valve is operated to vary the position of said small by pass with relation to the seat of the by pass member.

2. A flush valve comprising a casing, a main valve therein which divides the casing into two chambers, means for actuating said main valve, a by pass extending through the main valve, and connecting the two chambers, a by pass member loosely mounted in said by pass and normally partially closing the by pass, said by pass member having a non-sealing portion which permits water to flow when the by pass member is in its closed position, means for moving said by pass member when the valve is opened, the by pass member free to move about its axis in response to the flow of the water when the valve is open so as to change the position of said non-sealing portion with relation to the seat of the by pass member.

3. A flush valve comprising a casing, a main valve therein which divides the casing into two chambers, an auxiliary valve carried by said main valve, a by pass through said main valve connecting the two chambers, a by pass member loosely mounted in said by pass, an auxiliary by pass extending past the by pass member when it is in its closed position, means for moving said by pass member when the auxiliary valve is moved and means for changing the position of said auxiliary by pass with relation to the seat of the by pass member when the by pass member is moved.

4. A flush valve comprising a casing, a main valve therein having a body portion, said main valve being provided with a seating member having an outer upstanding wall, said seating member having an opening therethrough with an upstanding rib extending thereabout, a resilient seat located between said rib and upstanding wall and engaged by the end of the body portion of said main valve and an auxiliary valve having a downwardly projecting portion which extends past said rib and engages said seat.

5. A flush valve comprising a casing, a main valve therein, said main valve being provided with a seating member having an outer upstanding wall, said seating member having an opening therethrough with an upstanding rib extending thereabout, a resilient seat located between said rib and upstanding wall and an auxiliary valve having a downwardly projecting portion which extends past said rib and engages said seat, the seating member and the body portion of the main valve having a threaded connection, the seat for the auxiliary valve acting as a gasket between the seating portion and the body portion of the main valve to form a water tight joint between them.

6. A flush valve comprising a casing, a main valve in said casing, having a discharge passageway leading therefrom, a resilient seat for the main valve located in a groove surrounding said discharge opening and a ledge on the main valve which engages said seat when the valve is closed, said seat formed of rubber, a metal ring embedded in said rubber seat, said metal ring on its inner periphery being provided with alternating recesses and projections.

7. A seat for flush valves comprising a metal ring having on its inner periphery a series of alternating recesses and projections and a body of resilient material in which said metal ring is embedded.

8. A seat for flush valves comprising a metal ring having on its inner periphery a series of alternating recesses and projections and a body of resilient material in which said metal ring is embedded, the inner edges of the periphery of the body of resilient material being beveled.

9. A flush valve comprising a casing, an inwardly projecting ledge connected with said casing, a main flush valve member in said casing having a hollow central portion, a guiding device with which said hollow central portion is removably connected, a portion of said guiding device overlapping said ledge, a guiding part thereon which engages the inner face of said ledge, a portion of said guiding device extending through said ledge, an auxiliary valve located in said hollow central portion and a yielding seat for said auxiliary valve, said yielding seat being clamped between the end of the central portion and the said guiding part.

WILLIAM E. SLOAN.